A. WERNE.
Vinegar Apparatus.
No. 34,542.
Patented Feb. 25, 1862.
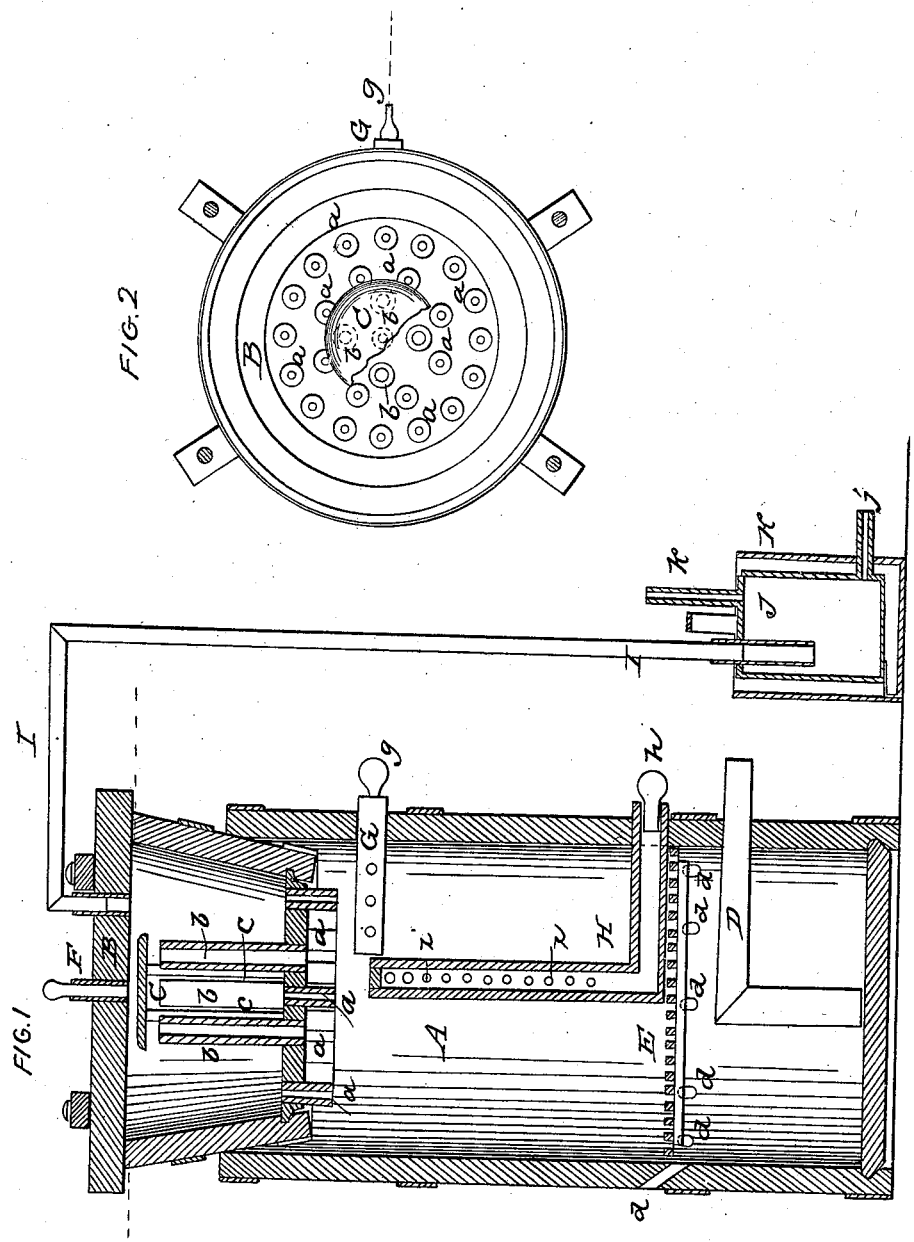

UNITED STATES PATENT OFFICE.

ANTHONY WERNÉ, OF PITTSTON, PENNSYLVANIA.

IMPROVED APPARATUS FOR MAKING VINEGAR BY THE QUICK PROCESS.

Specification forming part of Letters Patent No. 34,542, dated February 25, 1862.

*To all whom it may concern:*

Be it known that I, ANTHONY WERNÉ, of Pittston, in the county of Luzerne and State of Pennsylvania, have invented certain new and useful Improvements in Apparatus for the Manufacture of Vinegar by the Quick Process; and I do hereby declare that the following is a full, clear, and exact description of the same, reference being had to the accompanying drawings, forming part of this specification, in which—

Figure 1 is a central vertical section of an apparatus with my improvements, and Fig. 2 a plan of the vats with the cover removed.

Similar letters of reference indicate corresponding parts in both figures.

This invention consists in a novel arrangement of air-tubes for the escape of air, gases, and vapors from the acetifying-vat, in combination with the contrivances for distributing the liquid in the vat, whereby the distribution is effected very perfectly and efficient provision is afforded for the escape of the air, gases, and vapors.

It also consists in a certain arrangement of a pipe for cooling the interior of the vat whenever it becomes necessary; also, in the employment, in connection with the apparatus, of a condenser for the condensation of the vapors evolved in the process of manufacture and the collection of the products of such condensation.

To enable others skilled in the art to make and use my invention, I will proceed to describe its construction and operation.

A is the acetifying-vat, of any suitable or convenient size, having fitted tightly to its top or mouth a tub B, which is fitted with an air-tight but movable cover B'. This tub B has its entire bottom closely perforated, and the perforations fitted with very small tubes $a\ a$, made of glass or other suitable substance, whose upper ends are flush with the upper surface of the bottom and whose lower parts protrude through it, said tubes being for the distribution of the liquid from which the vinegar is to be made uniformly over a layer of corn-cobs upon the grating E, which is fitted into the vat A at a suitable distance from the bottom thereof. The bottom of the tub B is also fitted near its center with a small number (say, about four) of upright pipes $b\ b$, which reach nearly up to the top of the said tub, but are flush with the lower surface of its bottom, said pipes being for the escape of air, gases, and vapors from the acetifying-vat to the upper part of the tub B. These pipes $b\ b$ are all covered by a flat or convex topped shield C, on which the liquid is delivered by the feed-pipe F. This shield, which is supported on posts $c\ c$ resting on the bottom of the tub B, serves to prevent the liquid from entering the said pipes $b\ b$ and at the same time serves to distribute it over the bottom of the tub B.

The feed-pipe F is fitted with a stopper $f$, by which it is closed when no liquid is being supplied to the tub.

$d\ d$ are holes in the sides of the acetifying-vat A for the introduction of air below the grating E.

D is a pipe forming part of a siphon, by which the vinegar is drawn off from the bottom of the vat A.

G is a fixed wooden tube inserted through one side of the vat A for the reception of a thermometer to test the temperature of the interior of the vat. This tube is fitted at its outer end with a stopper $g$, which is removed to insert the thermometer.

H is an elbow-shaped wooden pipe of large size, having one limb standing upright in the center of the vat above the grating E and having the other limb protruding through one side of the vat. The upright portion of this pipe is closed at the top, but has numerous apertures $i\ i$ in its sides, and the lower portion of the pipe is fitted at its outer end with a movable stopper $h$. When the temperature of the vat is found by the thermometer to be too high, the stopper $h$ is withdrawn and communication established with the external atmosphere until a sufficient reduction of the temperature has taken place, when the stopper $h$ is replaced.

I is a pipe for the escape of the air, vapors, and gas from the tub B to a condensing-vessel J, which is surrounded by cold water in a vessel K. The liquid products of condensation are drawn from the vessel J by a pipe $j$, and the air and gases escape to the atmosphere by a pipe $k$ on top of the said vessel. The pipe $k$ serves as a draft-pipe to the whole apparatus. These products are returned to the tub B.

I do not claim, broadly, the use of the elevated tubes in the tub B, nor do I claim, broadly, the employment of air-tubes within the generator; nor do I claim, broadly, the condensation of the escaping vapors from vinegar apparatuses; but

What I claim as my invention, and desire to secure by Letters Patent, is—

1. The employment of the distributing-shield C, in combination with the tubes $b$ and tub B, as and for the purpose herein shown and described.

2. Having the bottom of the tub B provided with small tubes $a$, as and for the purpose herein shown and described.

3. The tube H, arranged and operating with the generator A, as herein shown and described.

4. The combination, with the generator, of the condenser J, constructed substantially as shown, and tube I, as and for the purpose herein shown and described.

ANTHONY WERNÉ.

Witnesses:
RANDALL JAGGARD,
JOHAN PFINGSTEN.